APPARATUS FOR EXTRUDING TUBULAR FILMS

Filed May 20, 1960 5 Sheets-Sheet 1

HERBERT O. CORBETT
INVENTOR.
BY E. J. Berry

APPARATUS FOR EXTRUDING TUBULAR FILMS

Filed May 20, 1960 5 Sheets-Sheet 2

HERBERT O. CORBETT
INVENTOR.

BY E. J. Berr

APPARATUS FOR EXTRUDING TUBULAR FILMS

Filed May 20, 1960 5 Sheets-Sheet 3

HERBERT O. CORBETT
INVENTOR.

BY E. J. Berry

APPARATUS FOR EXTRUDING TUBULAR FILMS

Filed May 20, 1960 5 Sheets-Sheet 4

HERBERT O. CORBETT
INVENTOR.

BY E. J. Berry

APPARATUS FOR EXTRUDING TUBULAR FILMS

Filed May 20, 1960 5 Sheets-Sheet 5

HERBERT O. CORBETT
INVENTOR.
BY E. J. Berry

United States Patent Office 3,088,167 Patented May 7, 1963

3,088,167

APPARATUS FOR EXTRUDING TUBULAR FILMS

Herbert O. Corbett, Canandaigua, N.Y., assignor to National Distillers and Chemical Corporation, New York, N.Y., a corporation of Virginia Filed May 20, 1960, Ser. No. 30,530
10 Claims. (Cl. 18—14)

The present invention relates to an apparatus for continuously extruding tubular webs of a thermoplastic material such as polyethylene. The invention relates, more particularly, to a circular or "do-nut" die structure adapted to provide readily available means for adjusting die lip spacing, and also to provide a simplified and improved means for expanding and cooling the tubular web formed by means of the die. The invention further relates to a system for forming extruded tubular webs from thermoplastic materials, including means for introducing a gaseous material into the tubular web and for controlling flow thereof into and from the interior of said web.

Conventionally, tubular webs of thermoplastic materials are produced by pressurized extrusion of a molten thermoplastic material through a die formed between an annular ring member and a core member fitted therein to provide a die orifice between the respective inner and outer peripheral edges of the respective parts. Under any circumstances this form of die structure requires precisely machined and matched peripheral die edge portions whereby to obtain extrusion of a web wherein the gauge or thickness is of a uniform dimension. Variation of the web gauge while operating such a system is virtually impossible, and extremely fine machining and mounting techniques are required to obtain the gauge uniformity required for production of a satisfactory product. In addition, the mass of the die structure increases at a rate which is out of all reasonable proportion to the increase in diameter of the orifice as the diameter of the die is enlarged. Furthermore, in the conventional core of mandrel type die structure, large surface areas are exposed to the extrusion pressures resulting in mandrel shank elongation and die ring deflection. Under such conditions it is almost impossible accurately to maintain any pre-determined die orifice dimension in large die structures of conventional design.

Still another problem in the operation of large diameter mandrel-type dies is encountered when extruding thermoplastics having a high melt index. The effective melt viscosity of such materials at the die orifice can be very low, resulting in the material piling or slumping in the immediate vicinity of the die. A tube cannot be started under such circumstances, nor can operation continue should it occur during an operation in progress.

The apparatus according to the present invention is intended to overcome the deficiencies of the conventional extrusion die. It is an object of the invention to provide a circular die structure wherein more uniform dimensions in gauge thickness may be obtained without excessive die mass. It is an especial object of the invention to provide such a die wherein, even in larger diameters, the die orifice dimension may be adjusted selectively and peripherally of the die without interruption of an extrusion operation in progress. It is a further object of the present invention to provide a simplified die structure and extrusion system wherein the extruded web may be formed and cooled by continuous introduction of a gaseous material internally of the web. In addition, it is an object of the present invention to provide a die structure wherein the effect of extrusion pressure on the die orifice conformation, and on deflection thereof is minimized.

The invention and its objects may be more fully understood from the following description when it is read in conjunction with the accompanying drawings, of which:

Figure 1:
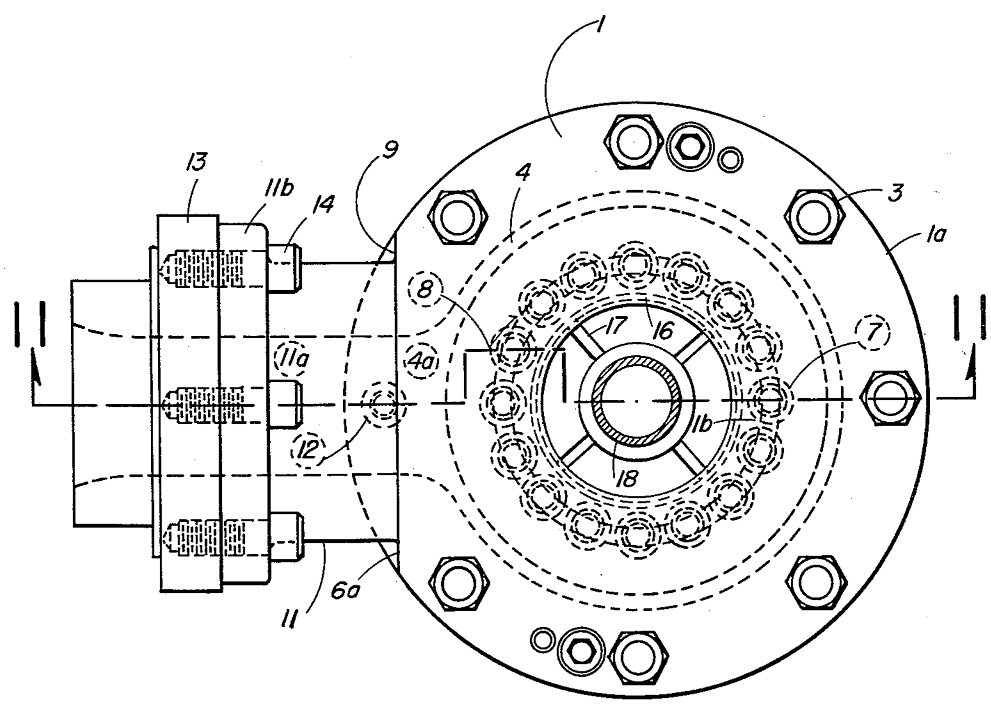
FIG. 1 is a plan view of a die structure according to the present invention, taken from above.
Figure 2:
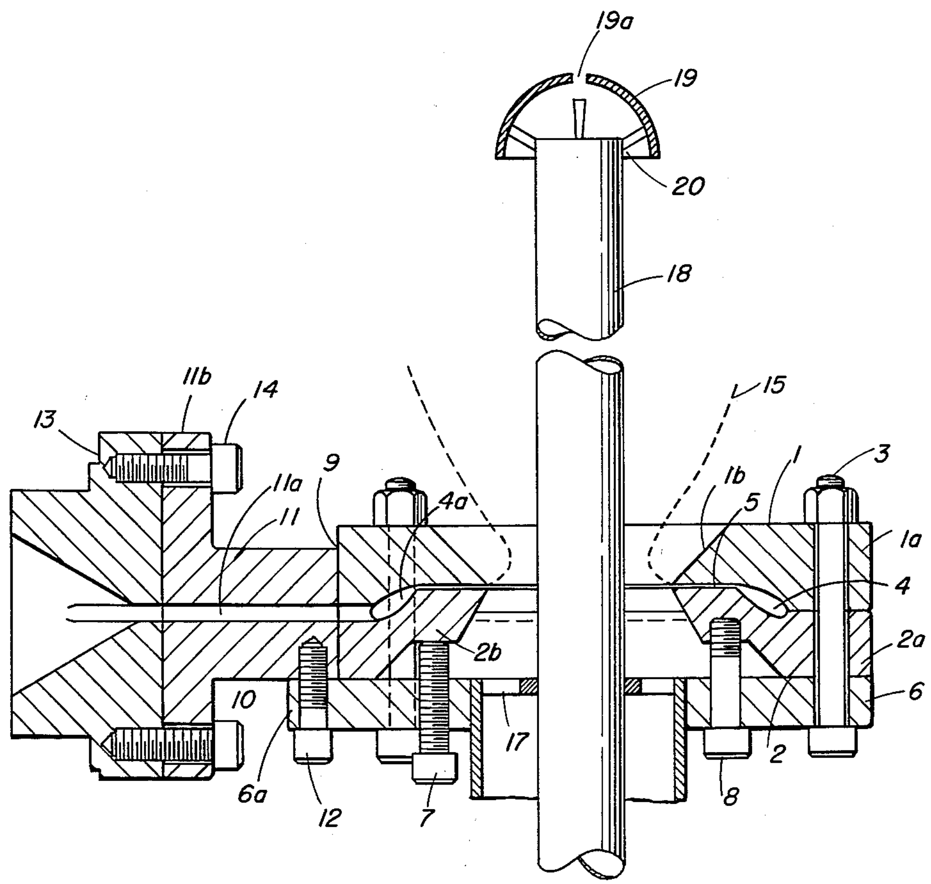
FIG. 2 is a view taken partly in vertical section along the line II—II of FIG. 1.

Referring now to the drawings in greater detail, in FIGS. 1 and 2, the numeral 1 designates the outer one of two annular die plates, the inner plate being designated by the numeral 2. Each of the plates is annular in form, including body portions *1a* and *2a* respectively around the outer peripheral edges of the plates, and lip portions *1b* and *2b* respectively forming the inner peripheral edges of the plates. Each plate also has an obserse and a reverse surface portion, wherein the reverse surface of the body portion of plate 1 is machined to match a machined obverse surface of plate 2, whereby to provide a substantially fluid tight seal between them. The plate body portions are drilled from surface to surface to provide alignable passageways adapted to receive assembly studs or bolts 3. The opposable reverse and obverse surface portions of the respective plates also are milled or routed in such fashion that, when the plates are assembled in the manner illustrated, an internal annular passageway 4 is defined between them, this passageway including a narrowed continuous section 5, terminating at the die lips formed at the innermost edges of the lip portions *1b* and *2b*, and opening there between.

Each of the lip portions, *1b* and *2b*, is shaped to provide frusto-conical surface portions extending outwardly, and away from the die lips. In this relationship, the form of the lip portion *1b* is of greatest significance, for reasons which will be apparent later.

Of the two die plates, the plate 1 has the greatest mass to provide integral rigidity. The plate 2 is of lesser mass, particularly in that portion constituting the lip portion *2b* whereby pressure induced by that of the melt or otherwise may cause deflection of the lip portion *2b*. This deflection is intended to be controlled and regulated, however, in order to provide for controlled annular adjustment of the die orifice formed between the respective plate lip portions.

Orifice adjustment, and controlled deflection of the lip *2b* are provided through the medium of an annular stud plate 6, and a series of adjusting studs 7 and 8. The plate 6 is drilled to match the passageways which receive the stud bolts 3, and is adapted to be secured thereby, along with the die plates 1 and 2. In addition, the stud plate is provided to receive a series of studs adapted to adjust the clearance between the lip portions *1b* and *2b*, thereby to vary the lateral dimension of the narrowed passageway section 5 there between. These studs 7 and 8 are arranged in two groups alternately about the inner periphery of the stud plate 6, and are equal in number from group to group.

The first group comprising studs 7 are provided for threaded engagement in correspondingly threaded passageways in the plate 6. These studs are adapted for pressured engagement with the reverse surface of the lip portion *2b* of plate 2. The second group, comprising studs 8, are adapted for free passage through the plate 6 into threaded engagement with corresponding threaded recess portions in the reverse surface of the lip portion 2b. By these means, the studs 7, held by threaded engagement with the plate 6, may be manipulated to force the lip portion 2b into closer relation to the lip portion 1b, while the studs 8 may be manipulated to draw the lip portion 2b away from the lip portion 1b, the heads of the studs 8 working against the resistance of the stud plate 6.

As shown more particularly in FIG. 1 each of the circular die plates 1 and 2 has flattened chordal sections as at 9 and 10 in the drawings, which are designed for a matching relationship in the assembled unit. By comparison, the stud plate is not so formed, thereby affording a ledge portion 6a which is adapted to extend radially beyond the die plates in the chordally sectioned areas 9 and 10 thereof.

Additionally, the opposable surfaces of the respective die plates are milled or routed along a radius which bisects the chordal sectioned areas whereby to provide a passageway 4a opening through the sectioned edge areas of the opposed die plates, into communication with the annular passageway 4. A nipple-like element 11, having an internal passageway 11a, is adapted for mounting in an abutting relationship to the chordal edge portions 9 and 10 with the passageways 4a and 11a in direct communication. Bolt means, designated by the numeral 12, may be employed to secure the nipple 11 to ledge portion 6a of the plate 6. While various expedients may be employed to secure and seal the inner end of the nipple to the die plates, as shown, the end of the nipple is welded to the surfaces of the plate chordally sectioned edges. Also as shown in the drawings, the nipple 11 is flanged at its outer end, as at 11b, and provided for attachment to the extruder head 13 of an extruder structure as by means of flange bolts 14.

The annular form of the do-nut die structure provided, according to the present invention is particularly adapted to permit circulation of a cooling gas into the interior of the tubular web 15 formed by means of the die structure contemplated. For this purpose, an exhaust gas tube 16 is fitted into the central opening of the stud plate 6. A spider element 17, fitted in the inner end of the exhaust tube, is adapted to center and support a gas inlet tube 18 extending upward therefrom into the space enclosed by the tubular web. The tube upper end preferably is provided with an inverted cup-shaped distributor head 19, having a centrally defined outlet 19a, and with the upper end of the tube 18 defining an annular reverse flow outlet 20.

In operation, the thermoplastic material is discharged under conventional conditions of temperature and pressure from the extruder head portion 13 through the passageways 11a, 4a, 4 and thence discharged by way of the annular die orifice 5. As in a conventional operation, the web is expanded by introducing air internally of the web, the web having been previously led through nip rolls adapted to retain the introduced air at the pressure of introduction. In the present invention, however, the operation is distinguished from the conventional by reason of provision for air circulation into and out of the space formed within the web, as described with reference to FIG. 3.

Figure 3:
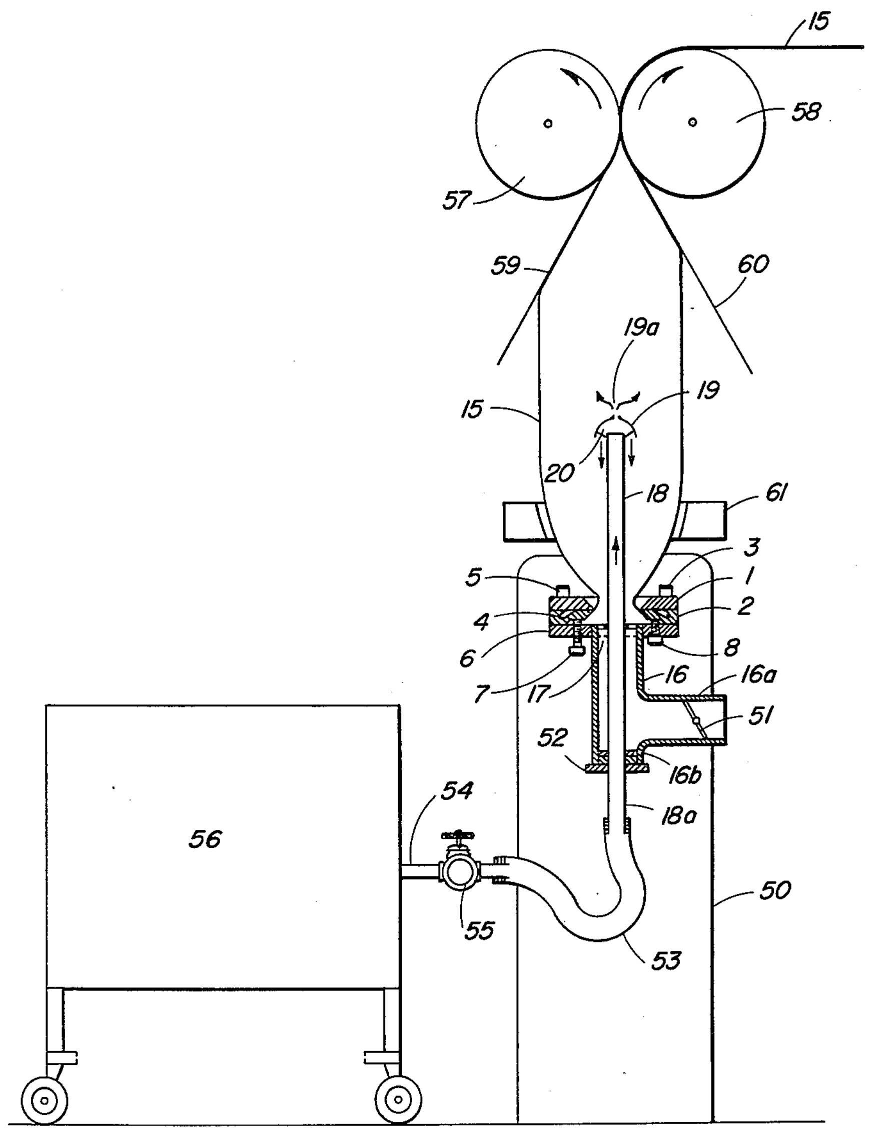
FIG. 3 is a schematic view, taken partly in vertical section, of a die structure according to FIGS. 1 and 2, as associated with extrusion means, and means for circulating a cooled, pressurized gaseous medium through a tubular web as extruded by the die.

FIG. 3 substantially illustrates an extruder including a die structure, such as illustrated by FIGS. 1 and 2. In addition, FIG. 3 more specifically illustrates the structural elements by means of which a gaseous material may be introduced into and circulated through the interior of the tubular web contemplated according to the present invention.

In the drawing, the numeral 50 designates a representation of an extruder unit. To this unit is attached a circular die assembly according to the showing of FIGS. 1 and 2, including die plates 1 and 2, a stud plate 6, assembly bolts 3, distributor passageway 4, orifice passageway 5, and adjusting studs 7 and 8. As in FIGS. 1 and 2, also, the numerals 16, 17, 18, 19, 19a, and 20 designate the gas exhaust tube, a spider, the gas inlet tube, a cap deflector, and passageways formed therein or thereby, in that sequence.

As shown in FIG. 3, the exhaust tube 16 is a T, including portions 16a and 16b. The portion 16a contains a butterfly valve 51, operable to control pressure within the web 15, and also the rate of circulation of a gaseous material therethrough. The portion 16b provides for a gland 52 adapted to form a pressure tight seal around the inlet tube 18 passed therethrough.

The outer end 18a of the inlet tube is connected, by means of a flexible tube 53, to the outlet 54 of a means for supplying a substantially continuous flow of a gas to be introduced and circulated through the web 15. A valve 55 is operable to control the rate and pressure of discharge through the outlet 54. The supply means itself is designated by the numeral 56, and, while not shown, may include a compressor and refrigeration means for chilling the gas supplied. For the purposes contemplated, air is a preferred gaseous material.

Also shown in FIG. 3, are a pair of nip rolls 57 and 58, and tube collapsing means such as shield elements 59 and 60. Both the rolls and the collapsing means may be in any conventionally known form. Likewise, an annular chill ring for applying chilled air to the exterior of the tube according to conventional procedures, is representatively shown in the drawing, and designated by the numeral 61.

In operation, employing the structure according to FIGS. 1, 2 and 3, the web is formed by extrusion of the molten plastic through the annular orifice 5, the web being grasped manually as it issues from the die, and guided upwardly to a point above the pipe 18 and the cap 19. Here the web is pinched to at least partially seal it while a gas such as air is introduced by way of the outlet 54, connection 53, and pipe 18. With the valve 51 closed, the web is thus expanded to its approximate desired dimension, while continuing to lead it manually toward the nip rolls. At some point in this operational step, adjustment of the valve 51 and/or the flow of gas may need to be adjusted in order to maintain expansion control.

After the web is led into engagement between the nip rolls the extrusion and draw-down of the web proceeds conventionally, with the shields 59 and 60 collapsing the tubular web as it passes to the nip rolls. Then, by suitable further adjustment of the butterfly valve 51 and the control valve 55, the desired pressure and circulation rate of air in the web is suitably established.

In a typical operation, employing an annular die structure having an internal diameter of about 3.5 inches, and an extrusion discharge rate of about ninety pounds per hour, a satisfactory tubular web having a diameter of about 8.5 inches and a gauge of about 1.125 mils was produced by continuously introducing air at a pressure of about .5 inch of water, while adjusting valve 51 to establish a circulation flow through the web, by way of exhaust tube 16, at a rate of about 25 cubic feet per minute. In this operation the air introduced by way of the tube 18 was chilled to a temperature of about 33° F., as was the air supplied through the ring 61. During this operation, the adjusting stud belts were manipulated to vary the web gauge between about 0.2 and about 3.0 mils without interruption of the extrusion process.

By circulating chilled air through the interior of the web the height of the "frost-line" of the extruded web may be more accurately controlled, whereby to produce a web having better characteristics of gloss and transparency. Also by accomplishing stabilization of and orientation of the web film more rapidly, other characteristics are improved, and with less likelihood of discontinuity or of web rupture at or after the die lips. Of course, as has been noted previously, the "knee-action" effect obtained in the web at the die lips eliminates a large degree of difficulties normally experienced as a result of any normal variation in draw-down or extrusion rates. Also, the stud bolt means provided for die orifice adjustment permit maintenance and change of the web gauge without interruption of the extrusion procedure.

Figure 4:
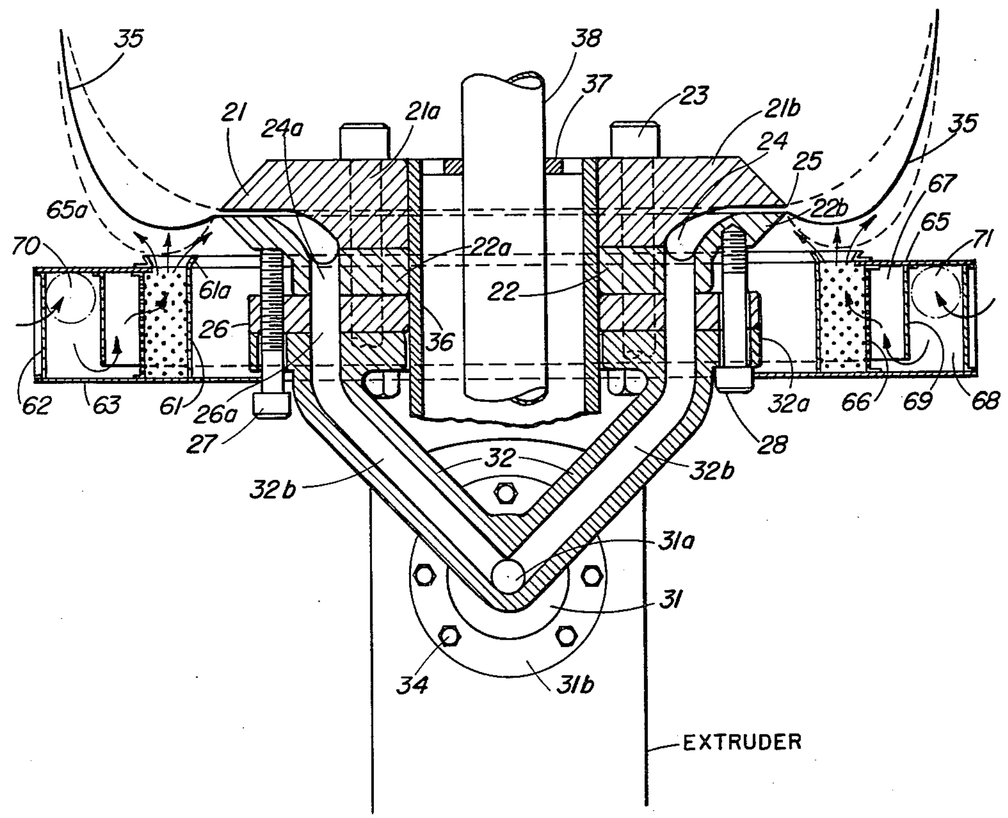
FIG. 4 is similar view of a modified form of the structure according to FIGS. 1 and 2.

The die structure illustrated by FIG. 4 is particularly characterized as an inverted do-nut design. Whereas in the structure according to FIGS. 1, 2, and 3, the annular die orifice opens inwardly of the annular die plates, in the structure according to FIG. 4, the orifice opens through the outer periphery of the structure. A particular advantage of this modified form of apparatus is that the diameter of the tubular web produced may be almost infinitely increased without excessive and disproportionate increase in the mass of the die structure, and that the supply of the thermoplastic melt may be more easily distributed for discharge from the die.

As shown, the annular die plates 21 and 22 correspond in most details to the plates 1 and 2 of FIGS. 1 and 2, except that the annular passageways 24 and 25 open through the outer periphery of the assembled die structure. In the structure as illustrated by FIG. 4 the parts indicated by the numerals 21 through 25 are substantially identical in nature and function with those parts indicated in FIGS. 1 and 2 by the numerals 1 through 5. Likewise, parts 36 to 40 inclusive are substantially identical with parts 16 to 20 inclusive of FIGS. 1 and 2.

Of course, in view of the fact that the die lips are at the outer periphery of the structure, certain modifications of the basic structure are essential. As shown by FIG. 4, the extruded thermoplastic material is supplied to the annular distributing passageway 24 by means of a bifurcate distributor including a head portion 31, flanged as at **31*b* for attachment to a correspondingly flanged extruder head (not shown) on an extruder indicated by dashed lines in FIG. 4. Bolts for this purpose are indicated by the numeral 34 applied to the bolt heads shown. From the head portion 31, a series of distributor legs 32 extend radially outward to terminate in flanged ends 32*a* adapted for attachment, as by welding, to a stud plate 31. Communciation between the annular distribution passageway 24, and the extruder is provided through passageways 24*a* opening through the reverse surface of the body portion 22*a* of plate 22, passageways 26*a* in the stud plate 26 and passageways 32*b* and 31*a* in the leg and head portion 32 and 31** of the distributor as shown.

In the structure as shown by FIG. 4, adjustment of the die orifice 25 is accomplished by means similar to those described with reference to FIGS. 1 and 2. In FIG. 4, however, the adjusting studs, corresponding to 7 and 8 of FIGS. 1 and 2, are designated by the numerals 27 and 28, and are located about the outer periphery of the stud plate 26.

The air ring, as shown in FIG. 4, comprises an annular casing having inner and outer peripheral wall portions 61 and 62, and a bottom wall 63. An annular cover plate 65 provides a partial closure for the upper end of the casing, extending radially inwardly from a juncture with the upper end of the outer wall portion 62 into spaced relation to the upper end of the inner wall 61. The inner wall has an inwardly flared lip portion **61*a* integral therewith, while the cover plate 65 is provided with a substantially matching, outwardly flared lip portion 65*a* along its inner peripheral edge. Preferably, the radial dimension of the cover plate, between outer and inner edge portions is adjusted to provide an annular orifice between the lower edges of the flared lips 61*a* and 65*a*** which may have a radial dimension in the range of from about $\frac{1}{16}$ inch to about 2 inches.

Within the casing a first baffle member is provided by means of an annular, perforate plate 66, secured at its lower edge to the upper surface of the bottom wall 63, and extending upwardly therefrom substantially to a level common to that of the wall portion 62, whereby to be engaged by the lower surface of the cover plate 65. This annular plate 66 has a diameter substantially greater than that of the inner wall portion 61 and is disposed in concentric radially spaced relation to such wall portion dividing the interior of the casing into inner and outer chambers 67 and 68 respectively.

The outer chamber 68 is itself divided into two, directly communicating, chamber portions by means of a second baffle plate, which is an imperforate, annular plate 69. The plate 69 has a vertical dimension somewhat less than that of the casing side wall portions 61 and 62, and a diameter greater than that of the baffle plate 66, so that, with one edge of the plate 69 attached to the under surface of the cover plate 65, the plate 69 is suspended in spaced relation to the upper surface of the bottom wall 63.

In the air ring structure shown, provision is made for introduction of air, or any other gaseous material employed, tangentially of the outer casing side wall portion 62. For this purpose two tangentially disposed inlet tubes 70 and 71 are provided in the air ring illustrated. The preferred arrangement, and disposition of these tubes are more clearly illustrated by means of FIG. 5. In this latter figure, the air ring structure alone is illustrated in plan view, from above, and with the cover plate 65 removed.

Operation of the die structure described with reference to FIG. 4 is comparable in every way with that of the structure as described with reference to FIGS. 1, 2, and 3. As in the structure according to FIGS. 1 and 2, the adjusting stud bolts 7 and 8 may be manipulated to widen or narrow the orifice passageway 5, so in the structure according to FIG. 4 the adjusting stud bolts 27 and 28 may be manipulated in similar fashion to widen or narrow the orifice passageway 25.

Figure 5:
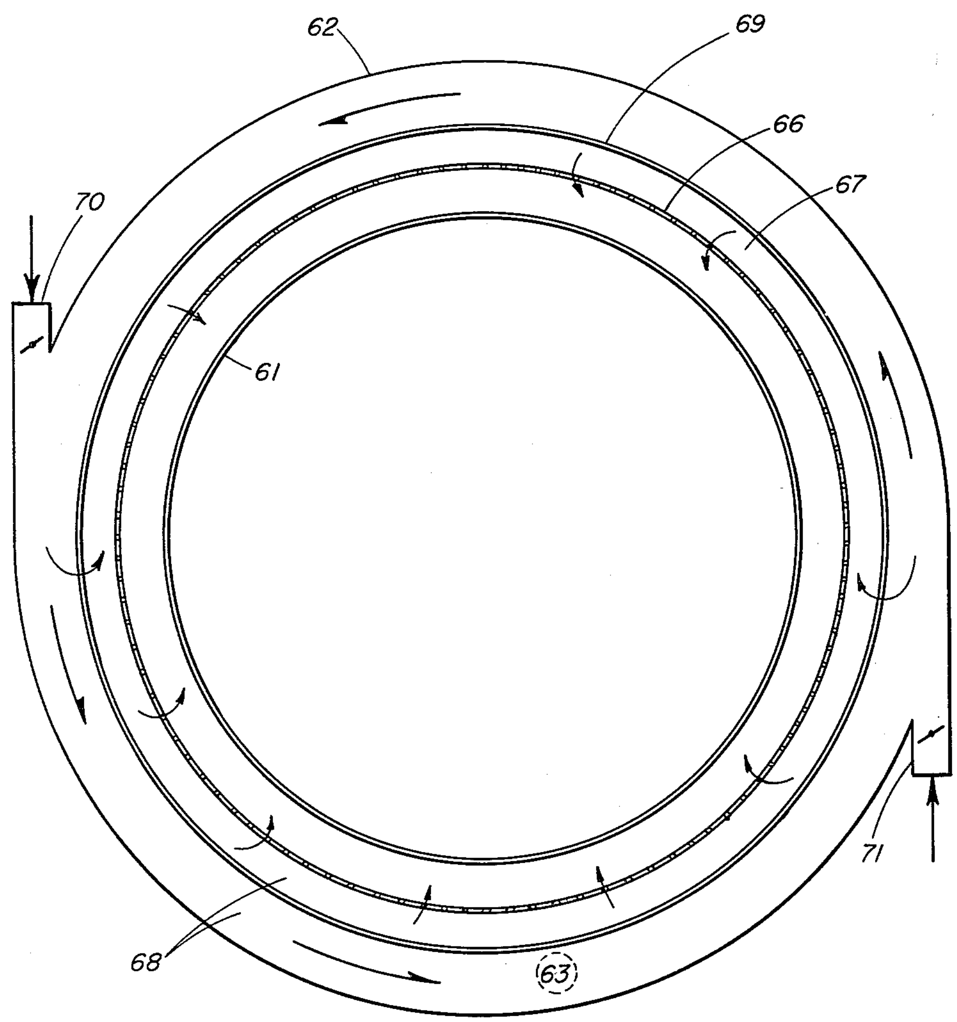
FIG. 5 is an open plan view of an air ring structure, according to FIG. 4, and taken from above.

As compared with the operation as described with reference to FIGS. 1, 2, and 3, however, the structural combination according to FIGS. 4 and 5 provides certain differences in operating characteristics and techniques. These characteristics and techniques result from the nature and functions of the air ring illustrated by FIGS. 4 and 5, and described by reference thereto.

Whereas in the operation of the apparatus particularly shown by FIG. 3, cooling gas applied externally of the tube formed is directed against the outer surface of the tube at some distance from the die lips, in the apparatus as illustrated by FIG. 4, application of external cooling gas is made in close proximity to the die lips, and below them. As thus applied, the cooling gas not only tends to set the extruded film in close proximity to the point at which it is most apt to rupture or fail, but also helps to support the issuing film to prevent distortion which can be caused by undue sagging of the film at the die lips, under certain operational conditions.

As illustrated by FIGS. 4 and 5, a cooling gas is introduced tangentially into the air ring whereby to produce a swirling flow, with improved distribution throughout the outer chamber 68, the baffle 69 aiding this action, and providing for uniform distribution of the gas under its lower edge. Thence, the cooling gas passes into the inner chamber 67, through the perforate baffle 66, and now with a minimum of turbulence. From the chamber 67, the cooling gas is discharged upwardly, through the orifice formed between the flared lips **61*a* and 65*a***, to be directed smoothly and uniformly against the bellied under surface of the tubular film as extruded from the die lips.

Preferably, the flow of gas into the air ring is adjusted to produce a static pressure therein of from about 1.2 inches of water, to about 3 pounds per square inch, and the orifice is adjusted to provide for discharge of gas therethrough at a velocity of from about 3000 to about 10,000 feet per minute. For example a gas supplied at the rate of about 1200 cubic feet per minute, and at a static pressure of 4 inches of water, might be discharged at a rate of about 10,000 feet per minute. As a more specific example, with an orifice having a radial dimension of about ⅛ inch and a circumferential dimension of 34 inches, a gaseous material discharged therefrom under a static pressure equal to about 3.9 inches of water would have a velocity of about 8,700 feet per minute, and a flow rate of about 250 cubic feet per minute. The support provided by the discharge of the cooling gas in this fashion, and at such volume and velocity, is considerable, and further implements the "knee-action" effect inherent in the radial discharge of the molten plastic material.

This knee-action effect is a particular operating advantage offered by structures according to the present invention. By reason of radial discharge of the molten thermoplastic material from the peripheral opening of the die orifice, clogging of the orifice by web slump is substantially avoided. As discharged from the circular orifice, any tendency for the web to slump or extend is compensated for by the fact that under the effect of gravity the web tends to belly along the line of discharge and beyond the orifice. The belly formed provides the knee-action effect which adjusts to any minor variation of draw-down or discharge rates. The knee-action effect is illustrated by dotted lines in FIG. 4 indicating movement of the web 35 according to operating conditions.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. An extrusion die comprising a pair of annular die plates assembled in concentric, opposed surface relation; an annular passageway defined between said die plates including also a continuous annular die orifice opening outwardly from said annular passageway between said die plates and peripherally thereof; at least one conduit passageway opening through at least one of said plates into communication with said annular passageway; an annular stud plate joined to one of said die plates in concentric, opposed surface relation thereto; and a series of studs disposed in circumferential spaced relation about the peripheral edge of said one die plate, certain of said studs extending through said annular stud plate in threaded association therewith to engage the lower surface of the peripheral edge of said one die plate and being adjustable to reduce the width of said die orifice, others of said studs being freely rotatable within said annular stud plate and having threaded engagement with the peripheral edge of said one die plate, said last mentioned studs being adjustable to increase the width of said die orifice.

2. An extrusion die according to claim 1, wherein said die orifice opens outwardly from between the outer peripheral edge portions of said annular plates.

3. An extrusion die according to claim 1, wherein said die orifice opens outwardly from between the inner peripheral edge portions of said annular die plates.

4. An extrusion die according to claim 1, wherein said conduit passageway is defined between said plates and extends radially thereof.

5. An extrusion die according to claim 1, wherein said conduit passageway is defined in one said plate, and extends therethrough in parallel relation to the center axis of said plate.

6. An extrusion die structure, comprising a pair of annular die plates joined in concentric, opposed surface relation; an annular passage defined between said plates intermediate the peripheral edge portions thereof; said annular passage opening radially outward by way of an annular die orifice defined between said plates along adjoining peripheral edge portions thereof, said adjoining edge portions constituting the lips of said orifice; at least one supply conduit passageway defined by at least one said plate opening into communication with said annular passageway; means for mounting said die and for connecting said supply conduit to a source of extruded plastic material; an annular stud plate joined to one of said die plates in concentric, opposed surface relation thereto; and a series of studs disposed in circumferential spaced relation about the peripheral edge of said one die plate, certain of said studs extending through said annular stud plate in threaded association therewith to engage the lower surface of the peripheral edge of said one die plate and being adjustable to reduce the width of said die orifice, others of said studs being freely rotatable within said annular stud plate and having threaded engagement with the peripheral edge of said one die plate, said last mentioned studs being adjustable to increase the width of said die orifice.

7. In combination with a die structure according to claim 6, a means for passing a gaseous material through the central opening in said annular die plates, comprising an exhaust tube fitted in substantially fluid tight relation to the inner periphery of at least one said plate valve means in said tube, adapted to control flow of said gaseous material therefrom; an inlet tube extended concentrically through said exhaust tube and said central opening of said die plates, said inlet tube having a first terminal end in a plane spaced from that of said second plate obverse surface, and a second terminal end exteriorly of said exhaust tube; and means connected to said inlet tube second terminal end for supplying a gaseous material thereto under pressure.

8. In combination with a die structure according to claim 6, a means for discharging a gaseous material upwardly from below said annular die orifice, comprising a hollow annular casing, including inner and outer side wall portions, a bottom wall and a separable annular cover plate, disposed in substantially concentric radially spaced relation to said die structure below said die orifice; an annular gas discharge orifice defined between said cover plate and said casing inner side wall portion; means for introducing a gaseous material into said casing; and means for uniform distribution of said gaseous material through said casing for substantially smooth flow discharge therefrom through said discharge orifice.

9. A structure according to claim 8, wherein said separable annular cover plate has an outer peripheral dimension substantially equal to that of said casing outer wall portion, and an inner peripheral dimension greater than that of said casing inner wall portion, whereby to establish said annular discharge orifice between said plate and said casing inner side wall portion so as to provide a radial dimension therefor which is in the range of from about $\frac{1}{16}$ inch to about 2 inches; and wherein said cover plate inner peripheral edge includes a lip portion extending angularly upward and outward therefrom.

10. A structure according to claim 8, wherein said means for uniform distribution of said gaseous material into said casing, and means for smooth flow discharge of said material through said discharge orifice, comprise a first imperforate, annular baffle member attached along one edge to the under surface of said cover plate, whereby to be dependent therefrom into vertically spaced relation to said casing bottom wall; and a second, perforate baffle member attached along one edge to said casing bottom wall portion to extend upwardly therefrom into engagement with the under surface of said cover plate, intermediate said first baffle member and said discharge orifice.

References Cited in the file of this patent

UNITED STATES PATENTS

| | | |
|---|---|---|
| 2,770,009 | Rogal et al. | Nov. 13, 1956 |
| 2,844,846 | Kronholm | July 29, 1958 |
| 2,926,384 | Hertz et al. | Mar. 1, 1960 |
| 2,963,741 | Longstreth et al. | Dec. 13, 1960 |

FOREIGN PATENTS

| | | |
|---|---|---|
| 153,610 | Australia | Oct. 13, 1953 |